United States Patent [19]

Azarnia et al.

[11] Patent Number: 4,623,680

[45] Date of Patent: Nov. 18, 1986

[54] AQUEOUS EPOXY RESIN DISPERSIONS FOR CAN COATING USE

[75] Inventors: Farah D. Azarnia; Jimmy D. Elmore, both of Louisville, Ky.

[73] Assignee: Celanese Corporation, New York, N.Y.

[21] Appl. No.: 740,351

[22] Filed: Jun. 3, 1985

[51] Int. Cl.[4] .......................... C09D 3/56; C09D 3/58; C09D 3/81

[52] U.S. Cl. .................................. 523/412; 523/100; 523/402; 523/408; 426/131; 427/239

[58] Field of Search ............... 523/412, 100, 402, 408; 426/131; 427/239

[56] References Cited

U.S. PATENT DOCUMENTS

| | | | |
|---|---|---|---|
| 3,118,848 | 1/1964 | Lombardi et al. | 523/412 |
| 3,492,252 | 1/1970 | Euchner et al. | 523/412 |
| 3,969,300 | 7/1976 | Nagata et al. | 523/412 |
| 4,212,781 | 7/1980 | Evans et al. | 523/403 |
| 4,247,439 | 1/1981 | Matthews et al. | 523/412 |
| 4,283,428 | 8/1981 | Birkmeyer | 426/131 |
| 4,289,811 | 9/1981 | Shelley, Jr. | 427/239 |
| 4,423,165 | 12/1983 | Harper et al. | 523/409 |
| 4,446,258 | 5/1984 | Chu et al. | 523/100 |
| 4,446,260 | 5/1984 | Woods et al. | 427/239 |
| 4,454,265 | 1/1984 | Tortorello et al. | 523/420 |

FOREIGN PATENT DOCUMENTS

| | | |
|---|---|---|
| 0006334 | 1/1980 | European Pat. Off. |
| 0006336 | 1/1980 | European Pat. Off. |
| 3006175 | 8/1981 | Fed. Rep. of Germany ...... 523/412 |

*Primary Examiner*—Ronald W. Griffin
*Attorney, Agent, or Firm*—Herbert P. Price

[57] ABSTRACT

Aqueous dispersions useful as can coating compositions are made from the ammonia or amine salt of a carboxyl functional acrylic copolymer blended with phenolplast resins, polyepoxide resins partially reacted with a monofunctional acid and, optionally, an epoxidized hydrocarbon or vegetable oil.

13 Claims, No Drawings

AQUEOUS EPOXY RESIN DISPERSIONS FOR CAN COATING USE

BACKGROUND OF THE INVENTION

The field of art of this invention is aqueous modified epoxy resin dispersions which are particularly useful for can coating compositions. In particular, this invention pertains to aqueous dispersions made from a carboxyl-functional acrylic copolymer, phenolic resins, an epoxy resin partially esterified with a monofunctional acid, and, optionally, an epoxidized hydrocarbon or unsaturated vegetable oil.

In the manufacture of metal containers, a thin, protective synthetic coating is applied to the interior of the container. The synthetic resins employed for coating the interior of the metal container are heat-curable polymeric compositions which are applied in the form of a solution or dispersion in a volatile organic solvent or water. When organic solvents are used, there is the problem of contending with the hazards of solvent vaporization and recovery during the drying and baking cycles of a coating operation.

The can manufacturing industry utilizes cans which are fabricated from aluminum or steel which may or may not be coated with tin. The interior of the cans are coated with a thin thermoset film to prevent contact of the interior metal surface of a can with its contents. Such coatings ideally should have good adhesion to the interior metal surface, low extractables to prevent contamination of the container contents and a rapid cure rate for economy of container manufacture. Typical synthetic resin coating compositions include vinyls, polybutadiene, epoxies, alkyd/aminoplast and oleoresinous materials.

There is a continuing effort to utilize coating compositions dispersed or dissolved in aqueous media in order to reduce or eliminate the emission of organic solvents to the atmosphere.

U.S. Pat. No. 3,118,848 describes coating compositions which are prepared by mixing together a water-soluble salt of a vinyl polymer and a water-soluble epoxy or polyhydroxy compound. One or more water-soluble phenolaldehyde or amino resins, notably water-soluble urea-aldehyde or melamine-aldehyde resins may optionally be included as curing agents where low baking temperatures are contemplated.

In U.S. Pat. No. 3,492,252, an epoxy resin is dispersed in an emulsion of a carboxyl-containing vinyl or acrylic copolymer. Additional film-forming materials, e.g., phenol/formaldehyde resins, can be added to improve coating properties.

U.S. Pat. No. 3,969,300 describes coating compositions made by copolymerizing epoxy resins partially esterified with acrylic acid with other monomers including acrylic acid. These copolymers are solubilized or dispersed in water with amines and are then blended with amino resins.

U.S. Pat. No. 4,247,439 describes water-borne reaction products of carboxyl-functional polymers, polyepoxides and tertiary amines which are useful as film-forming components of coating compositions. Such coating compositions can be sprayed, flowed, dipped, rollercoated or electrocoated. The coating compositions are useful as such or can be crosslinked with crosslinking agents such as nitrogen resins and phenolic resins.

U.S. Pat. No. 4,283,428 discloses metal containers having an internal surface coated with a cured layer of a water based coating composition made from an aqueous medium having dissolved or dispersed therein a neutralized reaction product of a polyepoxide and an aromatic amino acid containing at least one amine group and at least one carboxyl group. The reaction product has unreacted carboxyl groups which are neutralized with a base. Such compositions are crosslinked with aminoplast resins and phenolic resins.

U.S. Pat. No. 4,289,811 describes aqueous dispersions of mixed resins which are prepared by polymerizing in the presence of an aminoplast resin a mixture of polymerizable carboxylic acid monomers and other monomers followed by the addition of an epoxy resin, ammonia or amine to salt the acid groups, and then dispersing the resin mixture in water.

U.S. Pat. No. 4,423,165 describes water-borne reaction products of carboxyl-functional polymers, polyepoxides and tertiary amines which are blended with carboxy-functional polymers having an acid number dissimilar to that of the first carboxy-functional polymer. The resulting products are useful as film-forming components of coating compositions, especially useful for coating the insides of two piece tinplated steel cans of beverage and food. The coating compositions are useful as such or can be crosslinked with nitrogen resins or phenolic resins.

In U.S. Pat. No. 4,454,265, aqueous thermoset coating compositions are described which are made from amine adducts of epoxy resins cured with heat hardening phenol-formaldehyde resins.

U.S. Pat. No. 4,212,781 describes graft polymers made by reacting epoxy resins with copolymerizable monomers in the presence of at least 3% benzoyl peroxide. These graft copolymers, when dispersed in water, form useful coating compositions for cans.

European Patent Applications Nos. 6334 and 6336 describe resinous compositions made from epoxy esters copolymerized with acrylic acid and other monomers. The epoxy esters are the reaction products of polyepoxide resins and acrylic acid. Before reaction with the acrylic acid, the polyepoxide resins can be partially defunctionalized with phenols or saturated monocarboxylic acids. The resulting resinous compositions are salted with a base and are dissolved or dispersed in water to form coating compositions. Aminoplast or phenolplast resins can be added to enhance the cure of the coatings on baking.

SUMMARY OF THE INVENTION

The coating compositions of this invention are made from aqueous dispersions of resinous blends salted with ammonia or an amine. The resinous blends are made from (a) about 15 to about 30 weight percent of a carboxyl-functional acrylic copolymer, (b) about 10 to about 25 weight percent of phenolplast resins, (c) about 40 to about 75 weight percent of a partially defunctionalized polyepoxide resin, and (d) 0 to about 5 weight percent of an epoxidized hydrocarbon or vegetable oil. The carboxyl-functional acrylic copolymer has an average molecular weight of about 3,000 to about 30,000 and an acid value of about 100 to about 300. The partially defunctionalized polyepoxide resin before defunctionalization has an epoxide equivalent weight of about 750 to about 3,000 and is a diglycidyl ether of a dihydric phenol. The polyepoxide resin is defunctionalized by having about 2 to about 20 equivalent percent of its epoxide functionality reacted with a non-polymerizable monofunctional organic acid having a pKa in water of about 2 to about 5.

The coating compositions of this invention when applied to metal substrates and baked at a temperature of about 360° F. to about 410° F. for a time sufficient to cure the composition exhibit excellent adhesion. The compositions are particularly useful when applied to tinplated steel and tin-free steel, and especially to tinplated steel surfaces as low as 0.05 pound tin per base box. The compositions of this invention not only have improved adhesion when used to coat the interior of cans, but also have improved water resistance, resulting in improved processing and packed food resistance. For improved sulfur resistance, "C" enamels can be made from the compositions of this invention by the addition to the dispersion of zinc oxide and/or zinc carbonate pastes as well as pastes which contain zinc carboxylates, e.g., zinc stearate, zinc caprate, zinc oleate, zinc linoleate, zinc caprylate and the like.

DESCRIPTION OF THE INVENTION

The carboxyl-functional acrylic copolymers useful in this invention are prepared by conventional free radical polymerization processes from at least one polymerizable ethylenically unsaturated carboxylic acid monomer and at least one polymerizable ethylenically unsaturated monomer free of acid groups. Such polymerizable carboxylic acid monomers include acrylic acid, methacrylic acid, crotonic acid, itaconic acid, maleic acid or anhydride, fumaric acid, the monoesters of the dicarboxylic acid monomers, such as methyl hydrogen maleate or ethyl hydrogen fumarate and the like.

Suitable polymerizable ethylenically unsaturated monomers free of acid groups are vinyl aromatic compounds and alkyl esters of polymerizable ethylenically unsaturated carboxylic acids. Examples of such monomers include styrene, halostyrene, vinyl toluene, vinyl napthalene, the methyl, ethyl, propyl, butyl, hexyl, ethylhexyl and lauryl acrylates, methacrylates and crotonates, dimethylmaleate, dibutylfumarate and the like. Mixtures of these monomers can also be used. Other suitable polymerizable ethylenically unsaturated monomers include vinyl chloride, acrylonitrile, methacrylonitrile, vinyl acetate, vinyl propionate, vinyl stearate and the like.

The preferred monomers are styrene, methylacrylate, ethyl acrylate, butyl acrylate, acrylic acid and methacrylic acid. The most preferred monomers are styrene, ethyl acrylate and acrylic acid.

The carboxyl-functional acrylic copolymers useful in this invention have a polymerizable acid content of about 10 to about 50 weight percent and an acid value of about 100 to about 300. The average molecular weight of the copolymers is about 3,000 to about 30,000.

The phenolplast resins useful in this invention are made from phenols and formaldehyde. Such resins are made by reacting the phenol with formaldehyde under basic conditions. The resins have the phenol moieties linked together through methylene bridges and contain unreacted methylol groups. Useful phenolplast resins are derived from unsubstituted phenol, cresol and other alkyl phenols wherein the alkyl group contains from 2 to about 12 carbon atoms as well as dihydric phenols such as 2,2'(4-hydroxyphenyl) propane (Bisphenol A). Mixtures of phenols can be used to vary and control the properties of the phenolplast resins. Phenolplast resins useful in this invention have molecular weights within the range of about 300 to about 2500 and melting points of about 65° to about 100° C. Hot plate cure speed at 150° C. will vary from about 70 to about 180 seconds. In formulating the compositions of this invention, mixtures of phenolplast resins, as well as unmixed resins, can be used.

The polyepoxide resins useful in this invention are glycidyl polyethers of dihydric phenols and contain more than one 1,2-epoxide group per molecule. Such epoxy resins are derived from an epihalohydrin and polyhydric phenol and have epoxide equivalent weights of about 750 to about 3,000. Examples of epihalohydrins are epichlorohydrin, epibromohydrin, epiiodohydrin with epichlorohydrin being preferred. Dihydric phenols are exemplified by resorcinol, hydroquinone, 2,2'(4-hydroxyphenyl) propane (or Bisphenol A as it is commonly called), p,p'-dihydroxy- diphenyl, p,p'-dihydroxydiphenyl methane, p,p'-dihydroxydiphenyl ethane, bis-2-hydroxy naphthyl methane, 1,5-dihydroxy naphthalene and the like. Bisphenol A is the preferred dihydric phenol.

The polyepoxide resins are used in this invention are partially defunctionalized by having about 2 to about 20 equivalent percent of their epoxide functionality reacted with a non-polymerizable monofunctional organic acid having a pKa value of about 2 to about 5. Examples of such monofunctional acids are acetic acid, benzoic acid, dodecyl benzene sulfonic acid, butyric acid, caproic acid, benzylacetic acid, naphthalene sulfonic acid, caprylic acid, stearic acid and the like. The preferred acid is dodecyl benzene sulfonic acid, the use of which enhances the wettability and flexibility of the coating composition. If less than 0.02 equivalent of the monofunctional acid is used, processing is difficult and gel-free products cannot always be obtained. If more than 0.2 equivalent of the monofunctional acid is used, the can coating compositions have lower ionic barrier resistance as evidenced by decreased salt, acid and chemical resistance.

The epoxidized hydrocarbon or vegetable oil which can be used in the compositions of this invention are epoxidized polybutadiene, epoxidized soybean oil, drying oils which contain oleic, linoleic and linolenic acid, and the like.

Basic reagents used in this invention to neutralize the carboxyl groups of the acrylic copolymer include ammonia, primary, secondary and tertiary amines, such as ethylamine, butylamine, dimethylamine, triethylamine, isopropylamine, dimethylethylamine, cyclohexylamine, allylamine, benzylamine, morpholine, N-methyl morpholine, ethanolamine, diethanolamine and triethanolamine. The preferred amines are tertiary amines, such as dimethylethanolamine, triethylamine and n-methyl morpholine. The amount of basic reagent which is used to neutralize the carboxylic acid will vary from about 45% equivalent to about 95% equivalents based on the carboxylic acid functionality.

The resinous components used in this invention can be dissolved in an organic solvent in order to facilitate their dispersion in water. The organic solvent is preferably one which is substantially water-miscible, either in the form of a single polar compound or a mixture of compounds which can include non-polar constituents. The boiling point of the organic solvents will vary between about 150° to about 500° F.

Suitable solvents, either alone or in a mixture, include n-butanol, monomethyl ether of ethylene glycol, monoethyl ether of ethylene glycol, monobutyl ether of ethylene glycol, monomethyl ether of propylene glycol, monopropyl ether of ethylene glycol, monoethyl ether of propylene glycol, monobutyl ether of propylene glycol, monomethyl ether of diethylene glycol, monoethyl ether of diethylene glycol, monobutyl ether of diethylene glycol and the like. Non-polar solvents which can be included as minor constituents of the organic solvent component include aliphatic and aromatic hydrocarbons, such as naphtha, heptane, hexane, mineral spirits, toluene, xylene and the like.

In preparing the compositions of this invention, the organic solvents are used in the amount of about 5 to about 25 weight percent based upon the total weight of the dispersion.

In preparing the compositions of this invention, the epoxy resin in an organic solvent is partially defunctionalized by reaction with a monofunctional acid at about 180° to about 220° F. for 15 to 30 minutes. The carboxyl functional acrylic copolymer is then added followed by addition of the phenolplast resin. When solution is obtained, the mixture is then partially neutralized with an amine and is then dispersed in water. The resulting dispersion will have a solids content of about 30 to about 50 weight percent, preferably, about 33 to about 43 weight percent. The order of reactions and additions before the amine addition can be varied with comparable results.

The coating compositions of this invention are useful as coating compositions for the interior of metal cans, i.e., cans made from aluminum, tin free steel, tinplated steel and especially tinplated steel having a low tin content. The coatings are generally applied by roller coating or by being drawn down by Meyer bar at about 2 to about 9 milligrams per square inch, and, preferably, about 4 to about 6 milligrams per square inch. In order to cure the coatings, they are baked for about 8 to about 10 minutes at a temperature of about 360° to about 410° F. By reduction with proper solvents, e.g., butanol and water mixtures, the product can be applied by spraying.

The following examples are presented to more clearly define the invention. Parts and percentages, unless otherwise designated, are parts and percentages by weight.

EXAMPLE 1

To a suitable reactor equipped with a stirrer, temperature recording device, reflux condenser and dropping funnel were added 641 parts of water, 4,108 parts of n-butanol and 2,502 parts of ethylene glycol monobutyl ether. To the dropping funnel were added 4,065 parts of styrene, 1,909 parts of ethyl acrylate, 3,058 parts of acrylic acid and 641 parts of benzoyl peroxide. The reactor was heated to reflux (210° F.) under agitation. The monomer-catalyst mixture in the dropping funnel was added to the reactor over 150 minutes while holding the temperature at 205° to 210° F. After all the monomer-catalyst mixture had been added, the dropping funnel was rinsed with 198 parts of ethylene glycol monobutyl ether and the rinse solution was added to the reactor. The reactants were then cooled to 200° F. and held for one hour at this temperature. 90 parts of benzoyl peroxide were then added and the temperature of the reactants was held at 200° F. for an additional one hour. The reactor contents were then cooled to 130° F. and an additional 160 parts of ethylene glycol monobutyl ether were added. The resulting carboxyl functional acrylic copolymer solution at a solids content of 54 to 56% and a Gardner-Holdt viscosity at 25° C. of $Z_1$ to $Z_3$.

EXAMPLE 2

To a suitable reactor equipped as described in Example 1, were added 171 parts of a glycidyl polyether of Bisphenol A having an epoxide equivalent weight of 2100 to 2400, 10 parts of diethylene glycol monobutyl ether, 44 parts of n-butanol and 4 parts of ethylene glycol monobutyl ether. The reactor contents were heated to 200° F. to dissolve the epoxy resin. A solution of 3 parts of dodecyl benzene sulfonic acid and 6 parts of ethyleneglycol monobutyl ether were added to the reactor over a 5 minute period. After heating for 5 minutes at 200° F., 105 parts of the carboxyl functional acrylic copolymer solution of Example 1 were added over a one hour period while keeping the temperature at 200° F. After holding the temperature at 200° F. for an additional 15 minutes, 62 parts of a solution of a Bisphenol A phenolplast resin having an average molecular weight of about 900 to about 1000 dissolved at 46% solids in n-butanol 20/ethylene glycol monobutyl ether 40/xylene 40 were added over a 20 minute period while holding the temperature at 200° F. After an additional 15 minutes at 200° F., 28 parts of cresol phenolplast resin having an average molecular weight of about 2000 and a melting point of 72° to 78° C. were added over a 10 minute period while holding the temperature at 200° F. The temperature was then held for 1 hour at 200° F. followed by the addition of 13 parts dimethylethanolamine over a 15 minute period. After holding at 200° F. for 30 minutes, 355 parts of deionized water were added over an 80 minute period and the temperature was allowed to drop to about 140° F. and was held for 30 minutes at 130° to 140° F. The reactor contents were cooled to 100° F. and 6 parts of an emulsion of carnauba wax at 25% solids in water were added. After mixing for 30 minutes, additional deionized water was added to adjust the viscosity. The resulting product had an 83 second #4 Ford Cup viscosity, a solids content of 34.5% and 2.5 VOC (volatile organic content).

EXAMPLE 3

Using the same procedure as described in Example 2, 137 parts of a glycidyl polyether of Bisphenol A having an epoxide equivalent weight of 2100 to 2400 were dissolved in 17 parts of diethylene glycol monobutyl ether and 17 parts of n-butanol was reacted with 2.2 parts of dodecyl benzene sulfonic acid dissolved in 5 parts of ethylene glycol monobutyl ether. The resulting partially defunctionalized epoxy resin was then reacted with 83 parts of the carboxyl functional acrylic copolymer solution of Example 1, 23 parts of a Bisphenol A phenolplast resin having an average molecular weight of about 600 and a melting point of 65° to 75° C., 23 parts of a cresol phenolplast resin having an average molecular weight of 2000 and a melting point of 72° to 78° C., 11.5 parts of dimethylethanolamine, 343 parts of deionized water and 4.6 parts of a 25% emulsion of carnauba wax in water. The resulting product had a 74 second #4 Ford Cup viscosity at 34.8% solids and 1.8 VOC.

EXAMPLE 4

Using the same procedure described in Example 2, 73 parts of the epoxy resin described in Example 2 were dissolved in 9 parts of diethylene glycol monobutyl ether and 9 parts of butanol. The epoxy resin was then partially defunctionalized by reaction with 2.4 parts of dodecyl benzene sulfonic acid dissolved in 3 parts of ethylene glycol monobutyl ether. The resulting partially defunctionalized epoxy resin was then reacted with 44 parts of the carboxyl functional acrlyic copolymer solution of Example 1, 12 parts of the Bisphenol A phenolplast resin described in Example 3, 12 parts of the cresol phenolplast described in Example 3, and 6 parts of dimethylethanolamine. The resulting product was dispersed in 133 parts of deionized water. The resulting dispersion had a 29 second #4 Ford Cup viscosity and a solids content of 40.4%.

EXAMPLE 5

Using the same procedure described in Example 2, 137 parts of the glycidyl polyether described in Example 2 dissolved in 17 parts of diethylene glycol monobutyl ether and 17 parts of n-butanol was partially defunctionalized by reaction with 2.2 parts dodecyl benzene sulfonic acid dissolved in 5 parts of ethylene glycol monobutyl ether. The partially defunctionalized epoxy resin was then reacted with 83 parts of the carboxyl functional acrylic copolymer solution described in Example 1, 23 parts of the Bisphenol A phenolplast resin described in Example 3, 23 parts of the cresol phenolplast resin described in Example 3, 4.2 parts of a 55 aqueous solution of lanolin, 12 parts of epoxidized soybean oil and 11.5 parts of dimethylethanolamine. The resulting product, after being dispersed in 290 parts of deionized water, had a Ford Cup #4 viscosity of 65 seconds at 37% solids.

EXAMPLE 6

Each of the dispersions in Examples 2 through 5 were roll coated using a Wagner roll coater or drawndown by Meyer bar at 20-24 milligrams per 4 sq.in. film weight on tin free steel, 0.25 pound electrolytic tinplate and 0.05 pound electrolytic tinplate. The coatings were baked for 10 minutes at 360° to 400° F. When coated panels were subjected to severe processing conditions, either in water or in food products such as lima beans, cream of chicken soup or tomato paste, the adhesion of all the coatings was excellent.

In order to improve the sulfur resistance of the coatings, the dispersions were blended with zinc oxide paste in the amount of 5 to 25 weight percent zinc oxide based on the solids content of the coatings.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A coating composition which comprises an aqueous dispersion of a resinous blend salted with ammonia or an amine wherein the resinous blend, before salting, consists essentially of
    (a) about 15 to about 30 weight percent of a carboxyl functional acrylic copolymer;
    (b) about 10 to about 25 weight percent of a phenolplast resin;
    (c) about 40 to about 75 weight percent of a partially defunctionalized polyepoxide resin; and
    (d) about 0 to about 5 weight percent of an epoxidized hydrocarbon or vegetable oil,
wherein (a) has an average molecular weight of about 3,000 to about 30,000 and an acid value of about 100 to about 300, and wherein (c) is a diglycidyl ether of a dihydric phenol having an epoxide equivalent weight of about 750 to about 3,000 before defunctionalization having been reacted with about 0.02 to about 0.2 of equivalents per epoxide equivalent of a non-polymerizable monofunctional organic acid having a pKa of about 2.0 to about 5.

2. The composition of claim 1 wherein the carboxyl functional acrylic copolymer is a copolymer of at least one polymerizable ethylenically unsaturated carboxylic acid monomer and at least one polymerizable ethylenically unsaturated monomer free of acid groups.

3. The composition of claim 2 wherein the polymerizable ethylenically unsaturated carboxylic acid monomer is acrylic acid.

4. The composition of claim 2 wherein the polymerizable ethylenically unsaturated monomer free of acid groups is styrene and ethyl acrylate.

5. The composition of claim 2 wherein the phenolplast resin has an average molecular weight of about 300 to about 2500 and a melting point of about 65° C. to about 100° C.

6. The composition of claim 5 wherein the phenolplast resin is a resin derived from phenols selected from the group consisting of phenol, cresol and 2,2'(4-hydroxyphenyl) propane.

7. The composition of claim 2 wherein the diglycidyl ether of the dihydric phenol is a diglycidyl ether of 2,2'(4-hydroxyphenyl) propane.

8. The composition of claim 2 wherein the nonpolymerizable monofunctional organic acid having a pKa of about 2 to about 5 is dodecyl benzene sulfonic acid.

9. The composition of claim 1 wherein the epoxidized hydrocarbon is epoxidized polybutadiene.

10. The composition of claim 1 wherein the epoxidized vegetable oil is epoxidized soybean oil.

11. The composition of claim 1 which contains about 5 to about 25 weight percent, based on total solid content, of a zinc salt paste.

12. The composition of claim 11 wherein the zinc salt is zinc oxide.

13. The composition of claim 11 wherein part of the zinc salt is a zinc carboxylate.

* * * * *